United States Patent [19]

Arizono

[11] Patent Number: 4,910,664
[45] Date of Patent: Mar. 20, 1990

[54] DATA PROCESSOR WITH APPARATUS FOR REDUCING LOOP PROCESSING TIME

[75] Inventor: Takeshi Arizono, Itami, Japan

[73] Assignee: Mitsubishi Denki Kabushiki Kaisha, Japan

[21] Appl. No.: 126,045

[22] Filed: Nov. 27, 1987

[51] Int. Cl.$^4$ .............................................. G06F 1/00
[52] U.S. Cl. .................................. 364/200; 364/260.4; 364/260.8; 364/262
[58] Field of Search ............................. 364/200, 900

[56] References Cited

U.S. PATENT DOCUMENTS

| | | | |
|---|---|---|---|
| 4,429,361 | 1/1984 | Maccianti et al. | 364/200 |
| 4,462,074 | 7/1984 | Linde | 364/200 |
| 4,652,997 | 3/1987 | Kloker | 364/200 |
| 4,792,892 | 12/1988 | Mary et al. | 364/200 |

OTHER PUBLICATIONS

Intel Corporation (1983), "iPAX 286 Programmer's Reference Manual", pp. 3-21—322.

Primary Examiner—Raulfe B. Zache
Attorney, Agent, or Firm—Townsend and Townsend

[57] ABSTRACT

A data processing system with an apparatus for reducing loop processing time including an address reset circuit that resets the program counter and prefetch counter to the loop beginning address when the program executes the instruction at the loop ending address. The need for repeated address calculation for branching to a loop beginning address after each loop execution cycle is eliminated, thereby speeding up the loop processing.

6 Claims, 5 Drawing Sheets while instruction (operand code) (operand)

continue instruction break instruction

__while instruction__

__continue instruction__

__break instruction__

DATA PROCESSOR WITH APPARATUS FOR REDUCING LOOP PROCESSING TIME

BACKGROUND OF THE INVENTION

1. Field of the Invention

The present invention relates to a high-speed loop processing (repeated processing) occupying many portions of a substantial practical step of an exclusive or general data processor, in particular to a high-speed processing of an algorithm shown by a while sentence in C or Pascal language, a Do sentence in Fortran language and the like.

2. Description of the Prior Art

One of important control structures in a program of a data processor represented by a general micro processor, digital signal processor (DSP) and the like is a loop processing. A loop is a general idea effective in the case where the same processing is carried out for a large number of data and frequently used in the processing of a text block, array and the like.

For example, in a Centigrade-Fahrenheit temperature correspondence table printing program described in page 10 of the first edition, 1981, of B.W. Carnihan and F. M. Ritchy: "Programming Language C" (Kyoritsu Shuppan), in order to repeatedly carry out a Centigrade conversion-printing processing of a plurality of Fahrenheit temperature data having definite graduations from a lower limit to an upper limit in the temperature table, a loop processing expressed by a while sentence is used, as shown in Table 1.

This program shown in Table 1 means that a processing, in which a value of a lower limit is put in a variable fahr, subsequently a value of celsius=5/9 (fahr−32) being calculated until a value of the variable fahr becomes equal to a value of an upper limit, the value of fahr and value of celsius being indicated using a field of four and six digits, respectively, (in the latter down to one decimal place), a line being changed, and the value of fahr being increased at a graduation equal to a value of a step, is repeated.

TABLE 1

Prior Art

```
/*print Centigrade- Fahrenheit temperature*/
/*correspondence table for f = 0, 20, . . . , 300*/
main( )
{
    int lower, upper, step;
    float fahr, celsius;
    lower = 0;      \  */lower limit in temperature table*/
    upper = 300;    }  */upper limit*/
    step = 20;      /  */step*/
    fahr = lower;
    while(fahr< = upper) {
    celsius = (5.0/9.0)*(fahr-32.0);
        printf("%4.0f%6.1f n", fahr, celsius);
        fahr = fahr + step;
    )
)
```

In a usual program a loop structure expressed by a while sentence or for sentence is generally used side by side with an if-else structure but a substantial processing sequence of the loop processing occupies a rate larger than that occupied by a number of steps in high-level language. Accordingly, in order to high-speed data processor as a whole, the high-speed loop processing portion is indispensable.

In the conventional data processor, in order to carry out this loop processing, a branch instruction, loop instruction, or condition test, decrement and branch instruction have been used. For example, in a 16 bit micro processor 18086 manufactured by Intel, Corp., the loop processing corresponding to a while sentence of said Centigrade-Fahrenheit temperature correspondence table program has been carried out using a branch instruction shown in Table 2.

This Table 2 means that a value of a variable lower is transferred to fahr, a value of fahr being compared with a value of upper, and if both are equal to each other, the value of the variable lower is jumped to a instruction int with a label end marked, otherwise the program itself being executed, a sum of the value of fahr and a value of step being stored in fahr, and the stored sum being returned to a instruction cmp with a label begin marked. In addition, the control is returned to an operating system by executing the instruction int.

TABLE 2

Prior Art

```
:/*Centigrade-Fahrenheit temperature
:    correspondence table printing program
:    lower = 0;     are assumed to be stored in memory
:    upper = 300,   or register and initialized
:    step = 20
:    fahr is assumed to be stored in memory*/
         mov fahr, lower
begin:   cmp fahr upper
         jb end
main portion of Centigrade-Fahrenheit conversion
program written by Assembler language
(converting and printing value of fahr to Fahrenheit)
         add fahr, step
         jmp begin
end:     int return ;program end interruption
```

In the conventional data processor including 18086, it is necessary to carry out a processing, in which the addition of a value of current program counter (PC) to a value of address offset, which is an operand of the data processor, is carried out, to calculate the subsequent instruction address after every branch. As to 18086, this fact is described in the description of branch instruction (p. 177 to p. 196) of an iAPX86 macro-assembly language programming manual published by Intel Japan, Ltd, on Feb. 20, 1981. In addition, although it is not shown in Table 2, an algorithm, in which loop instruction, which is another instruction for supporting a loop in 18086, reduces the contents of a CX register "1" by "1" after every passage thereof through the loop and a displacement disp of the loop is added to a instruction pointer IP until a value of the CX resister amounts to "0", as shown by C language in Table 3, is executed and also in the branch by this instruction, it is necessary to obtain the subsequent instruction address. This fact also is described in the above described manual (p. 201 to p. 203).

TABLE 3

Prior Art

```
/*algorithm of loop instruction*/
    while(CX− − = =0) {
         IP=IP+disp;
    }
```

Since the loop processing of the conventional data processor machine has been carried out in the above described manner, problems have occurred in that it is necessary to calculate a branch address after every one loop processing and an unnecessary prefetch is carried out over a branch instruction address, as shown in FIG. 1, whereby a wasteful bus cycle is generated to lower a speed of the loop processing.

In addition, these problems are particularly called in question in the last step of a code block forming the loop. Because it is necessary to branch to a loop-beginning address to continue the loop in this step.

SUMMARY OF THE INVENTION

The present invention was achieved for the elimination of the above described problems and it is an object of the present invention to provide a data processor requiring no address calculation for branching to a loop-beginning address excepting a first time in the loop.

It is a further object of the present inventin to provide a data processor capable of executing a high-speed loop processing by compulsorily resetting a prefetch address at an address of a loop-beginning portion in the case where a prefetch is intended to be carried out over a loop-end address.

A data processor according to the present invention is provided with two registers for memorizing a loop-beginning address and a loop-end address, respectively, therewithin. And, in the case where in a prefetch counter and a programmable counter a block of count values of the prefetch counter and the programmable counter or addresses, which are loaded with said count values, contains the loop-end address, the data processor is provided with means capable of resetting the above described counters at the loop-beginning address. In addition, the data processor according to the present invention is provided with an execution unit capable of directly executing a while instruction, which is a machine code for setting specified operational results in the above described two registers, a break instruction, which is a machine code for resetting the program counter at the loop-end address, and a continue instruction, which is a machine code for resetting the program counter at the loop-beginning address.

According to a data processor of the present invention, on account of the above described construction, the execution unit resets a loop-beginning address register at a instruction address immediately after this while instruction declared at the head of the loop and a loop-end address register at a sum of an address offset value, which is an operand of the while instruction, and in the present program counter.

The address-resetting means resets the prefetch counter at the loop-beginning address value when the prefetch is on the point of exceeding the loop-end address register value. In addition, the address-resetting means resets this program counter at the loop-beginning address register value also when the program counter becomes equal to the loop-end address register value.

In addition, since if the break instruction is executed in the loop, the program counter is reset at the loop-end address to be gone out of the loop, and similarly if the continue instruction is executed, the program counter is reset as the loop-beginning address to continue the loop, the address calculation for branching to the loop-beginning address can be omitted excepting the first one time in the loop and the prefetch address is compulsorily reset at the loop-beginning portion when the prefetch is on the point of exceeding the loop-end address, whereby unnecessary bus cycles can be prevented from generating.

The above and further objects and features of the invention will more fully be apparent from the following detailed description with accompanying drawings.

BRIEF DESCRIPTION OF THE DRAWINGS

FIG. 10 is a diagram showing a preferred embodiment of the printing program shown in FIG. 1.

DESCRIPTION OF THE PREFERRED EMBODIMENTS

The present invention will be described below in detail with reference to the drawings.

Figure 2:
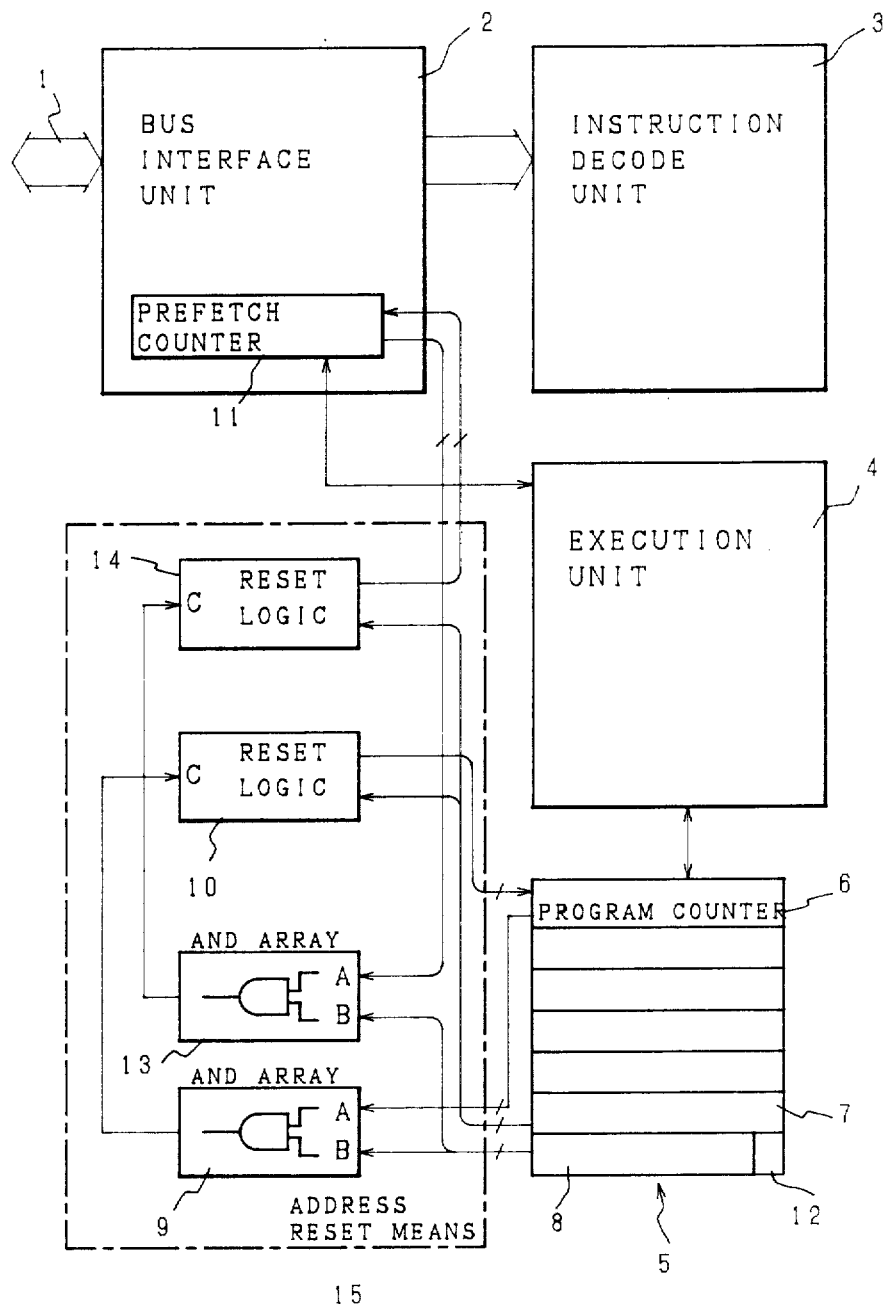
FIG. 2 is a block diagram showing a construction of one preferred embodiment of a data processor according to the present invention.

Referring now to FIG. 2 showing one preferred embodiment of a data processor according to the present invention, reference numberal 1 designates a 16 bit external bus, reference numeral 2 designating a bus interface unit for controlling an access to this 16 bit external bus, reference numeral 3 designating an instruction decode unit for decoding a instruction code fetched by said bus interface unit 2, reference numeral 4 designating a execution unit for carrying out a practical processing in accordance with a instruction decoded by said instruction decode unit, reference numeral 5 designating a register block, reference numeral 6 designating a program counter, reference numberal 7 designating a loop-beginning address register, reference numeral 8 designating a loop-end address register, and reference numeral 9 designating an AND array with an output of said loop-end address register 8 and an output of said program counter 6 as an input operating as a first coincidence-detecting means for detecting the coincidence of both outputs.

In addition, reference numeral 10 designates a reset logic as a means to be controlled by an output of the AND array 9 and for resetting the above described program counter 6 by the contents of the above described loop-beginning address register 7, reference numeral 11 designating a prefetch counter included in the above described bus interface unit 2 for holding a prefetch address, reference numeral 12 designating a LSB of the loop-end address register which is the lowest bit (LSB) of the loop-end address register 8, reference numeral 13 designating an AND array with bit outputs other than the output of the above described loop-end address register 8 and individual LSBs of the prefetch counter 11 as an input for operating as a second coincidence-detecting means detecting the coincidence of both outputs, reference numeral 14 designating a reset logic to be controlled by said AND array 13 and for resetting said prefetch counter 11 at the contents of the above described loop-beginning address register 7, and reference numeral 15 designating an address reset means comprising the above described AND arrays 9, 13 and reset logics 10, 14.

Figure 3:
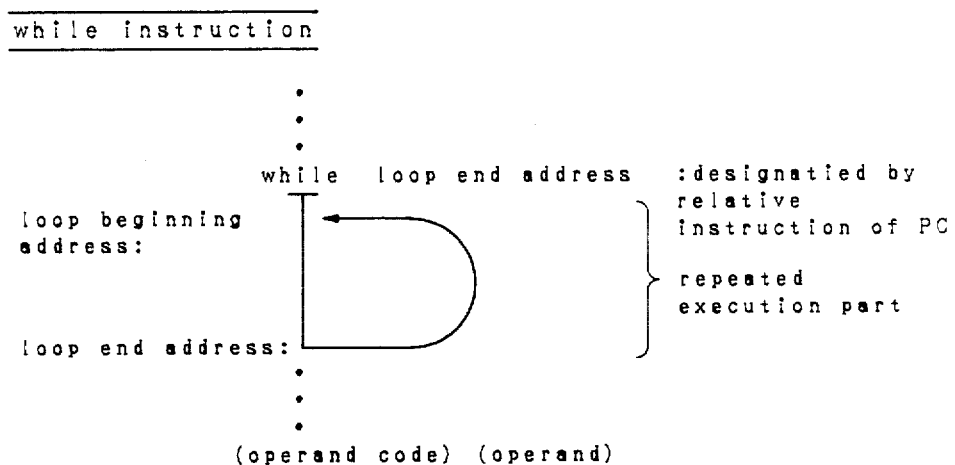
FIGS. 3(a), (b) and (c) are schematic diagrams for explaining functions of three characteristic instructions which a data processor according to the present invention has.
Figure 3:
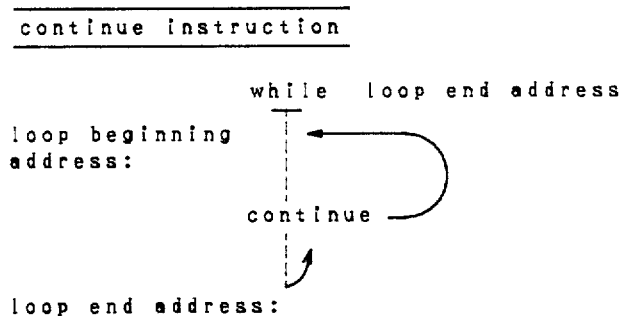
Figure 3:
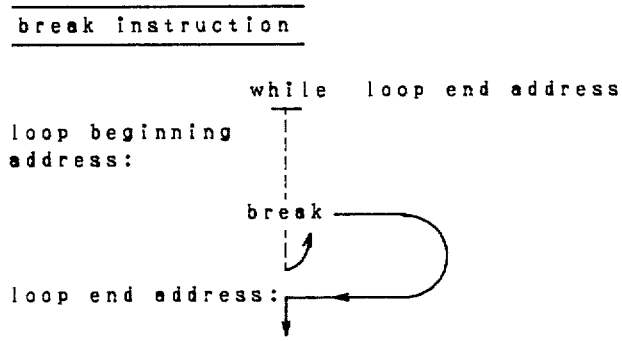

Besides, FIGS. 3(a), (b) and (c) show a function of each of a while instruction, continue instruction and break instruction provided anew in an apparatus according to the present preferred embodiment. The while instruction repeatedly executes instructions from an instruction subsequent thereto to an instruction immediately before the loop-end address appointed by an operand. In addition, the continue instruction is an instruction for jumping to the loop-beginning address, and it is equivalent to MOV, PC (program counter), LBAR (loop-beginning address register) and the like. Furthermore, the break instruction is an instruction for jumping to the loop-end address and going out of the loop, and it is equivalent MOV, PC, LEAR (loop-end address register) and the like.

Figure 4:
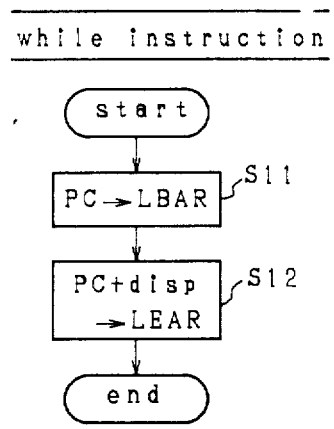
FIGS. 4(a), (b) and (c) are schematic diagrams for explaining an action of each instruction shown in FIG. 8.
Figure 4:
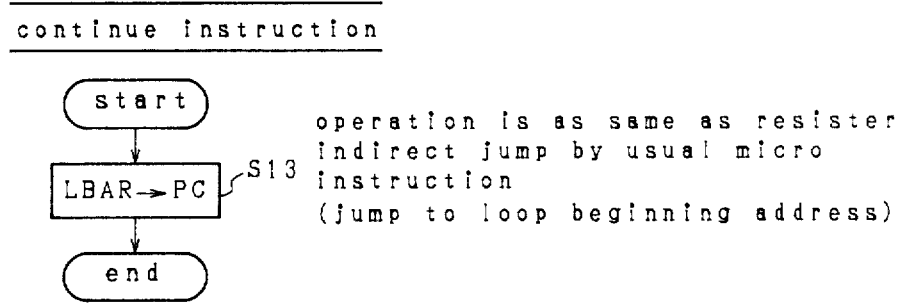
Figure 4:
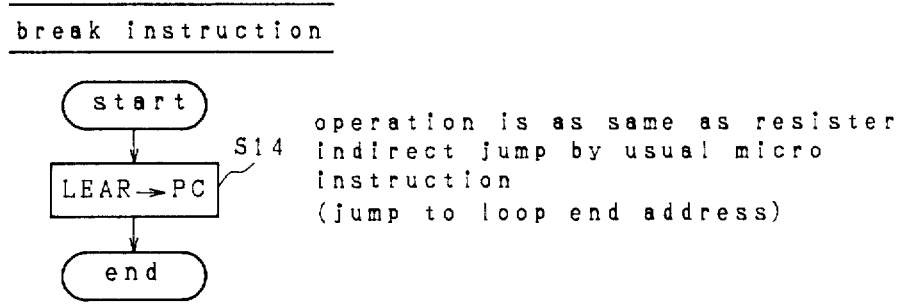

Besides, FIGS. 4(a), (b) and (c) show an operation of each instruction of the above described while instruction, continue instruction and break instruction. The while instruction itself is a transmission instruction for merely setting the loop-beginning address and the loop-end address (step S11 and S12), a hardware of the data processor controlling the execution in accordance with these set addresses. Since the loop-end address is given as a "while disp" in a PC correspondence address, an absolute address is calculated in the step S12. In addition, the action of the continue instruction and break instruction is same as a register indirect jump by a unual micro instruction, jumping to the loop-beginning address and the loop-end address, respectively, by executing the step S13 and the step S14.

Figure 5:
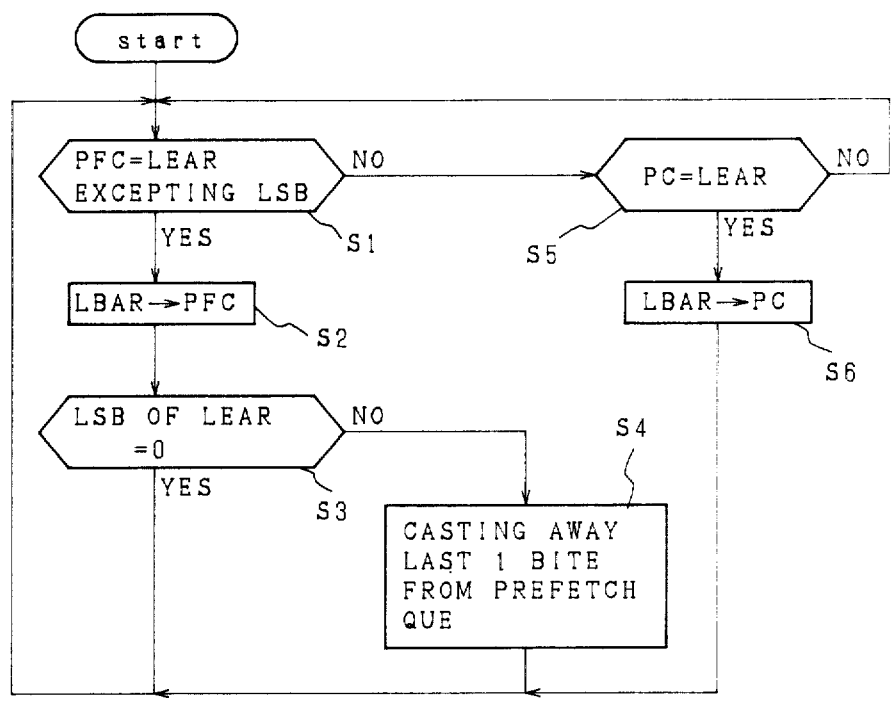
FIG. 5 is a schematic diagram for explaining an operation of a microprocessor according to the present invention during a time when a while instruction is executed.

Furthermore, FIG. 5 is a flow chart showing an operation of a data processor according to the present invention during a time when the while instruction is executed.

Next, the operation will be described with reference to FIG. 2 and FIG. 5.

An instruction fetched from the 16 bits external bus 1 by the bus interface unit 2 is decoded by the instruction decode unit 3 and executed in the execution unit 4. In this time, if the instruction is while instruction, the contents of the program counter 6 are stored in the loop-beginning address register 7 by the execution unit 4. In addition, a value of a sum of an address offset, which is an operand of this while instruction, and the contents of the present program counter 6, that is to say a relative address, is stored in the loop-end address register 8 as the loop-end address.

Subsequently, an instruction execution step is made progress and the prefetch prior to the instruction execution arrives at the words including the loop-end address. In short, when all bits of the loop-end address register 8 and the prefetch counter 11 excepting LSB coincide with each other and an output of the AND array 13 is activated (step S1), the present prefetch is finished by the reset logic 14 and then the prefetch counter 11 is reset at the contents of the loop-beginning address register 7 (step S2).

Figure 1:
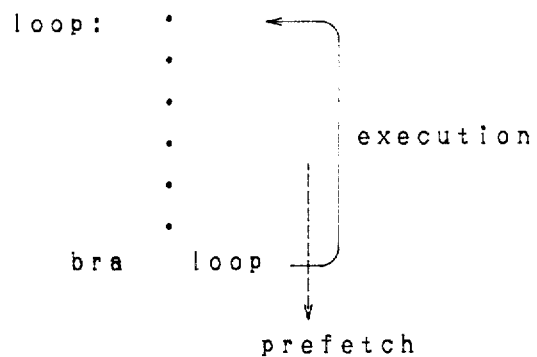
FIG. 1 is a schematic diagram showing a manner of carrying out a prefetch over a loop-end address in the conventional processor.
Figure 6:
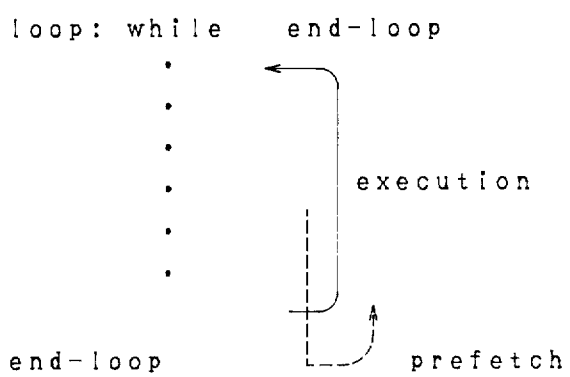
FIG. 6 is a schematic diagram showing a manner in which a prefetch address passes from a loop-end address to a loop-beginning address.

Accordingly, as shown in FIG. 6, the prefetch address by the prefetch counter 11 is returned to the loop-beginning address. In addition, in this prefetch a bite fetch and a word fetch are determined in dependence upon a value of the loop-end register LSB (step S3) and if LSB=0, the bus interface unit 2 abandons one bite from a prefetch Q (step S4).

After the prefetch of this loop-end address, when the instruction execution step arrives at the loop-end address, in short the program counter 6 coincides with the loop-end address register 8 in contents to activate an output of the AND array 9 (step S5), the present instruction is finished by the reset logic 10 and then the program counter 6 is reset at the contents of the loop-beginning address register 7 (step S6). The program counter 6 is also reset at the contents of the loop-beginning address register 7 similarly by the execution of the continue instruction. Furthermore, the execution of the break instruction resets the program counter 6 at the contents of the loop-end address register 8, whereby achieving a high-speed loop processing in which the instruction execution and the prefetch are carried out along the loop in a hardware-like manner.

Please pay attention to that the program counter always indicates a instruction address immediately after a instruction address, which is being executed, in the above described operation. Furthermore, in this preferred embodiment the expression of the algorithm shown in Table 1 is expressed in Table 4.

TABLE 4

```
/*Centigrade-Fahrnheit temperature
  correspondence table printing program
  lower = 0 ;        \   are assumed to be stored in memory
  upper = 300;       )   or register and initialized
  step = 20;         /
  fahr is assumed to be stored in memory*/
  mov fahr, lower
  while loop end
  cmp fahr upper
  jb end
      main portion of Centigrade-Fahrenheit conversion
      program written by Assembler language
      (converting and printing value of fahr to Fahenheit)
  loop end: add fahr, step
  end: int return ; program end interruption
```

Although the plural bite prefetch is carried out in the above described preferred embodiment, only one bit may be prefetched with the same effect as in the above described preferred embodiment.

In addition, although an operand of the while instruction appointed in a relative address manner is shown in the above described preferred embodiment, an absolute address manner may be used with the same effect as in the above described preferred embodiment.

As above described, about a data processor according to the present invention, since a program counter and a prefetch counter are adapted to be capable of compulsorily resetting at a loop-beginning address by means of a hardware, a wasteful prefetch is not produced during a loop processing. In addition, an address-calculation in the case of a branch to the loop-beginning address becomes unnecessary excepting the first one time, whereby a high-speed loop processing can be achieved. An effect occurs also in that high-grade language, such as C, Pascal, can be supported more directly and in higher speed by means of this while instruction or break, continue instructions.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claim, or equivalence of such meets and bounds thereof are therefore intended to be embraced by the claims.

What is claimed is:

1. A data processing system for decreasing loop processing time comprising:
    a prefetch counter indicating an address of an instruction to be prefetched;
    a program counter indicating an address of an instruction under execution;
    a loop-beginning address register for storing a beginning address of a loop portion of a program;
    a loop-end address register for storing an address after the completion of the loop;
    an execution unit for executing a while instruction for storing a loop-beginning address in the loop-beginning address register and storing the loop-end address in the loop-end address register, respectively, a continue instruction resetting said program counter to the contents of said loop-beginning address register, and a break instruction for resetting said program counter to the contents of said loop-end address register, and
    an address reset means coupled to the program counter and loop-end address register, for the address stored in the loop-beginning address register to the program counter when the coincidence an address stored in the program counter and the address stored in the loop-end address register is detected; and coupled to the prefetch counter and loop-end address register, for moving the address stored in the loop-beginning address register to the prefetch counter when the coincidence of the the address stored in the prefetch counter and the address stored in the loop-end address register is detected.

2. A data processing system as set forth in claim 1, in which an instruction for storing a loop-beginning address in the loop-beginning address register and storing a loop-end address after the completion of the loop in the loop-end address register is positioned just before a loop of a program.

3. A data processing system as set forth in claim 1, in which said execution unit prohibits a reset operation of said address reset means only in the executing an instruction that moves the address stored in the loop-end address register into the program counter.

4. A data processing system as set forth in claim 1, in which the address reset means is composed of a wired logic.

5. A data processing system as set forth in claim 1, in which the prefetch counter executes prefetching of a plurality of words, wherein said prefetch counter further comprises:
    means for reseting said prefetch counter to the stored in said loop-beginning address register if a fetched word in said plurality of prefetched words has the same address as the address stored in said loop-end register.

6. A data processing system for decreasing loop processing time comprising:
    a prefetch counter indicating an address of an instruction to be prefetched;
    a program counter indicating an address of an instruction under execution;
    a loop-beginning address register for storing a beginning address of a loop-portion of a program;
    a loop-end address register for storing an address after the completion of the loop;
    an address reset means coupled to the program counter and loop-end address register, for moving the address stored in the loop-beginning address register to the program counter when the coincidence of and address in the program counter and the address stored in the loop-end address register is detected, and also coupled to the prefetch counter and loop-end address register, and for moving the address stored in the loop-beginning address register to the prefetch counter when the coincidence of the address stored in of the prefetch counter and the address stored in the loop-end address register is detected.

* * * * *